Figure 1:
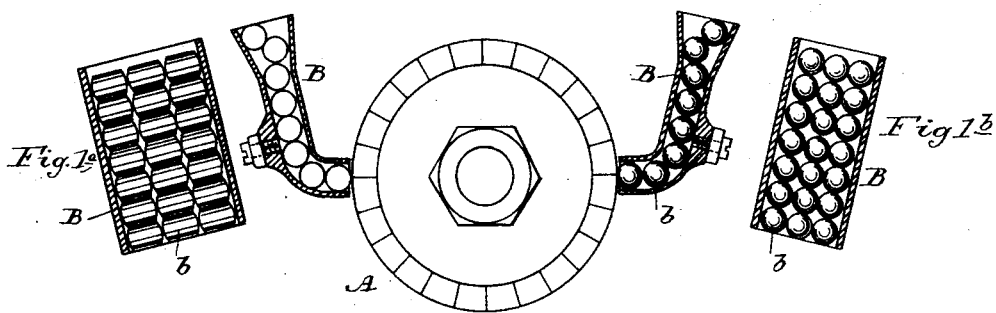

(No Model.)   2 Sheets—Sheet 1.

P. DIEHL.
COMMUTATOR BRUSH.

No. 423,912.   Patented Mar. 25, 1890.

WITNESSES:
A. V. Cushman
Ira R. Steward

INVENTOR:
Philip Diehl
BY Henry Calver
ATTORNEY.

(No Model.)  P. DIEHL.  2 Sheets—Sheet 2.
COMMUTATOR BRUSH.

No. 423,912.  Patented Mar. 25, 1890.

WITNESSES:
H. V. Cushman
Ira R. Steward

INVENTOR:
Philip Diehl
BY
Henry Calver
ATTORNEY.

UNITED STATES PATENT OFFICE.

PHILIP DIEHL, OF ELIZABETH, NEW JERSEY.

COMMUTATOR-BRUSH.

SPECIFICATION forming part of Letters Patent No. 423,912, dated March 25, 1890.

Application filed January 27, 1890. Serial No. 338,246. (No model.)

*To all whom it may concern:*

Be it known that I, PHILIP DIEHL, a citizen of the United States, residing at Elizabeth, in the county of Union and State of New Jersey, have invented certain new and useful Improvements in Commutator-Brushes, of which the following is a specification, reference being had therein to the accompanying drawings.

The brushes at present commonly in use in commutators for electric motors and dynamos consist of strips of copper or other metal held in yielding contact with the faces of the commutators; but these strips wear out rapidly and require frequent renewal, and, owing to to the inclined positions in which they are placed, are liable to be injured or broken if the motor-shaft be turned slightly backward, as sometimes occurs with motors for driving rotary fans and other purposes. It has been attempted to avoid the objections incidental to these strip-brushes by using pivoted contact-rollers running on the faces of the commutators; but as these rollers were objectionable, for the reason that their pivots required much oiling, and also for the reason that more or less dirt would gather on their contact-faces and be rolled on the commutators, and thus prevent perfect contacts.

My invention has for its object to obviate the objections above noted by providing non-pivoted or loose rolling contact devices for commutators which will require no oil and which will have a tendency to rub themselves and the faces of the commutators clear of any dirt which may accumulate; and to this end I provide vertical or inclined conducting tubes or receptacles, the lower ends of which are adjacent to the contact-faces of the commutators, and within these receptacles I place loosely a number of small balls or rollers of metal, carbon, or other suitable conducting material, the lowermost of the balls or rollers being held in contact with the faces of the commutator-sections by their own gravity and by the weight of those above. The electrical current will pass through the balls to the conducting tubes or receptacles, to which latter suitable conducting-wires are attached. If it be desired to increase the weight or pressure on the contact balls or rollers to insure safe contacts, only one or two sets of the latter need be used, and the tubes or receptacles can be filled above them with shot to press them down. These balls or rollers, running loosely in their tubes or receptacles, require no oiling, and will rub any dirt which may collect off from each other and off from the contact-faces of the commutator-sections, so that perfect conducting contacts are always maintained, and any accidental backward turning of the commutators will do no harm, as will be obvious.

Figure 2:
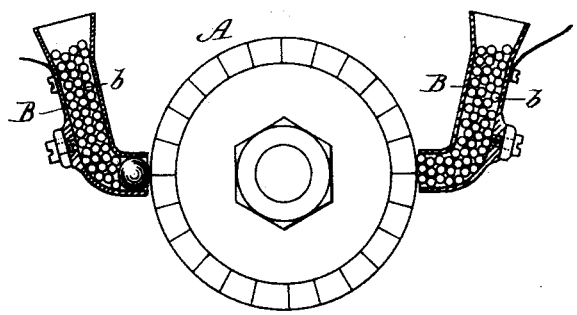
Figure 3:
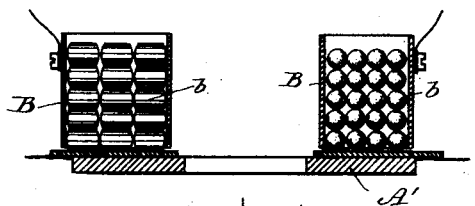
Figure 4:
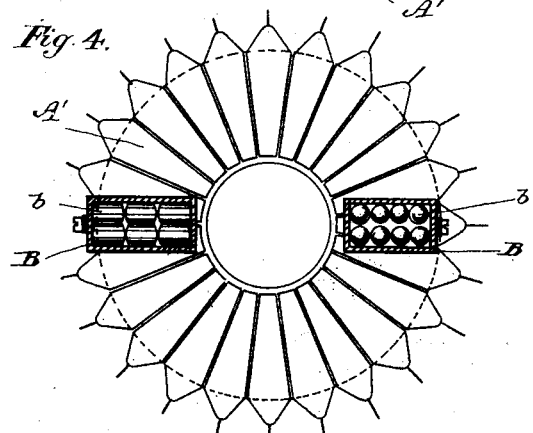

In the accompanying drawings, Figures 1 and 2 are side views of commutators provided with my improved rolling contact devices, the tubes or receptacles containing the latter being in section. Figs. 1$^a$ and 1$^b$ are detail sectional views of the conducting-tubes shown in Fig. 1, showing different forms of rolling contact devices. Figs. 3, 4, 5, and 6 are different views illustrating the application of my invention to flat commutators, Figs. 3 and 4 representing a flat horizontally-rotating commutator, and Figs. 5 and 6 a flat vertically-rotating commutator.

A denotes an ordinary cylindrical commutator, and B conducting tubes or receptacles having their lower ends placed closely adjacent to the contact-face of the commutator, suitable conducting-wires being attached to said tubes. Within the tubes or receptacles B are loosely placed a quantity of small rolling contact devices $b$, of any suitable conducting material. These rolling contact devices may be small rollers or cylinders, as shown in Fig. 1$^a$ and at the left side of Figs. 3 and 4, or they may be large or small balls, as shown in Figs. 1, 1$^b$, 2, and 5, and at the right of Figs. 3 and 4, or they may consist of one large ball and a quantity of very small ones, as shown at the left of Fig. 2.

Figure 6:
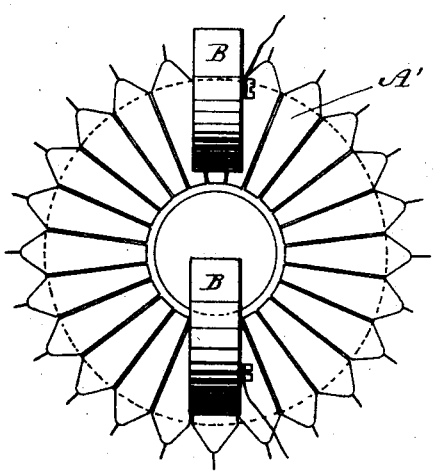
Figure 5:
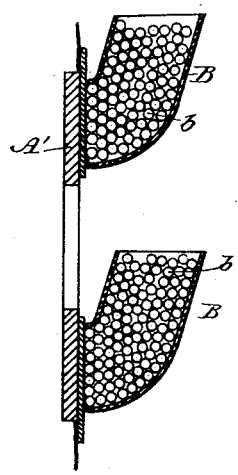

In Figs. 3 and 4 the commutator A' is shown as consisting of a series of flat sections rotating in a horizontal plane, and the tubes or receptacles are therefore vertical, while in Figs. 5 and 6 the commutators A' consist of flat sections rotating in a vertical plane, and the tubes are therefore inclined, as they also are in Figs. 1 and 2.

In all the forms of my invention shown it will be observed that the lowermost of the loose balls or rollers in the tubes or receptacles are in rolling contact with the faces of the commutator-sections, and are held in contact by their own weight and by the weight of those above them. A sufficient number of these loose rolling contact balls or rollers are provided, so that if one set or series should momentarily fail to make the proper electrical connections the other sets or series will preserve an unbroken conducting medium, so that any danger from sparking, owing to imperfect conducting mediums through these rolling brushes, is thus certainly avoided.

As the balls or rollers work loosely in their tubes or receptacles, they require no oiling, and it is obvious that should they become worn or broken they can be easily replaced. It has, moreover, been found in practice that owing to their looseness they effectively rub all dirt off from each other and also off from the faces of the commutator-sections, thus always keeping all contact-faces clean and bright and insuring perfect electrical connections.

I thus provide rolling contact devices or brushes which obviate the objections incidental to the use of the strip or roller brushes heretofore in use, this result being effected by employing tubes or receptacles in which are loosely placed rolling cylinders or balls, some of which run in contact with the faces of the commutator-sections to transmit the current from the commutators to the conducting tubes or receptacles and the conductors attached to the latter.

I claim—

1. A commutator-brush consisting of a tube or receptacle and a series of loose contact devices therein.

2. The combination, with the commutator of an electric motor or dynamo, of tubes or receptacles containing loose contact devices, a portion of which are contiguous to the sections of the commutator.

3. The combination, with the rotary sections of a commutator, of conducting tubes or receptacles containing loose rolling contact devices, a portion of which are contiguous to the sections of the said commutator.

In testimony whereof I affix my signature in presence of two witnesses.

PHILIP DIEHL.

Witnesses:
W. H. RYAN,
J. W. RYAN.